(12) United States Patent
Boehnke et al.

(10) Patent No.: US 9,777,104 B2
(45) Date of Patent: *Oct. 3, 2017

(54) RIGID POLYURETHANE FOAMS WITH HIGH ACOUSTIC ABSORPTION

(71) Applicant: Covestro Deutschland AG, Leverkusen (DE)

(72) Inventors: Lutz Boehnke, Overath (DE); Joern Beaujean, Leverkusen (DE); Rolf Albach, Kööln (DE); Jun Li, Shanghai (CN); Ling Shi, Shanghai (CN)

(73) Assignee: Covestro Deutschland AG, Leverkusen (DE)

( * ) Notice: Subject to any disclaimer, the term of this patent is extended or adjusted under 35 U.S.C. 154(b) by 110 days.

This patent is subject to a terminal disclaimer.

(21) Appl. No.: 14/779,678

(22) PCT Filed: Mar. 25, 2013

(86) PCT No.: PCT/CN2013/073114
§ 371 (c)(1),
(2) Date: Sep. 24, 2015

(87) PCT Pub. No.: WO2014/153701
PCT Pub. Date: Oct. 2, 2014

(65) Prior Publication Data
US 2016/0046758 A1    Feb. 18, 2016

(51) Int. Cl.
*C08G 18/76* (2006.01)
*C08J 9/02* (2006.01)
*C08G 18/48* (2006.01)
*C08G 18/66* (2006.01)
*C08G 18/32* (2006.01)
*C08G 101/00* (2006.01)

(52) U.S. Cl.
CPC ..... *C08G 18/7671* (2013.01); *C08G 18/3206* (2013.01); *C08G 18/485* (2013.01); *C08G 18/4816* (2013.01); *C08G 18/4825* (2013.01); *C08G 18/4837* (2013.01); *C08G 18/6677* (2013.01); *C08G 18/7664* (2013.01); *C08J 9/02* (2013.01); *C08G 18/4804* (2013.01); *C08G 18/4812* (2013.01); *C08G 2101/0025* (2013.01); *C08G 2350/00* (2013.01); *C08J 2201/022* (2013.01); *C08J 2205/05* (2013.01); *C08J 2205/10* (2013.01); *C08J 2375/08* (2013.01)

(58) Field of Classification Search
CPC ............ C08G 18/4804; C08G 18/4812; C08G 18/4816
See application file for complete search history.

(56) References Cited

U.S. PATENT DOCUMENTS

| | | |
|---|---|---|
| 4,863,976 A | 9/1989 | Nichols et al. |
| 5,219,893 A | 6/1993 | König et al. |
| 5,482,979 A | 1/1996 | Sanders et al. |
| 8,188,156 B2 | 5/2012 | Yamanaka et al. |
| 2006/0142407 A1 | 6/2006 | Hollmann et al. |
| 2008/0227879 A1* | 9/2008 | Lee .................... C08G 18/1841 521/128 |

FOREIGN PATENT DOCUMENTS

| | | |
|---|---|---|
| CN | 101848955 A | 9/2010 |
| CN | 102093527 A | 6/2011 |
| EP | 0437787 A1 | 7/1991 |
| EP | 0 629 607 A2 | 12/1994 |

OTHER PUBLICATIONS

International Search Report for PCT/CN2013/073114 dated Jan. 2, 2014.

* cited by examiner

*Primary Examiner* — Melissa Rioja
(74) *Attorney, Agent, or Firm* — K&L Gates LLP

(57) ABSTRACT

The present invention relates to predominantly (>50 vol %) open-cell (to DIN ISO 4590-5 86), cold-deformable, rigid polyurethane foams which possess high acoustic absorption and a uniform cell structure and which are suitable for producing automotive interior trim, more particularly roof linings and pillar trim.

7 Claims, No Drawings

RIGID POLYURETHANE FOAMS WITH HIGH ACOUSTIC ABSORPTION

CROSS-REFERENCE TO RELATED APPLICATIONS

This application is a national stage application (under 35 U.S.C. §371) of PCT/CN2013/073114, filed Mar. 25, 2013, which is incorporated herein by reference in its entirety.

The present invention relates to predominantly (>50 vol %) open-cell (to DIN ISO 4590-86), cold-deformable, rigid polyurethane foams which possess high acoustic absorption and a uniform cell structure and which are suitable for producing automotive interior trim, more particularly roof linings and pillar trim.

Rigid polyurethane (PU) foams as an interlayer for sandwich structures, and also the use thereof in the production of automotive interior trim, are known per se.

Sandwich structures for use as roof lining or pillar trim are nowadays usually produced by the cold-forming process from corresponding sandwich panels. In this process, the rigid PU foam panel is provided on both sides with a thermosetting adhesive and with reinforcing materials, such as mats or webs of glass fibre and/or natural fibre, and/or glass fibre rovings, and also with outer layers of paper, thermoplastic films and/or nonwoven fibre webs, and optionally decorative layers, and subjected to deformation and pressing to a sandwich in a mould at temperatures of 100 to 150° C.

In the case of the batch production of foam slabs (referred to as "box foaming") which are used in the production of automotive interior trim, car roof linings, etc., a desirable feature in the foams produced is high acoustic absorption. Foam panels of standard formulations, of the kind described in EP 0437787 A1, however, attain only moderate acoustic absorption levels. Surprisingly, furthermore, the foam panels from the bottom region of the block only have a significantly lower acoustic absorption. When the foam panels are used in the production of car roof linings, for example, this leads to differences in the acoustic absorption of these car roof linings, which is undesirable.

According to EP 0437787 A1, thermoplastically deformable rigid PU foams having densities of 25-30 kg/m$^3$ can be produced by reacting mixtures of diphenylmethane diisocyanates (MDI) and polyphenyl-polymethylene polyisocyanates having an MDI content of 70 to 90 wt %, of which 12-30 wt % constitutes 2,4'-diphenylmethane diisocyanate and 10-30 wt % constitutes polyphenyl-polymethylene polyisocyantes (isocyanate component), with a polyol mixture made up of 50 to 70 wt % of a di- and/or trifunctional polyoxyalkylene polyol having a hydroxyl number of 28 to 600, 20 to 35 wt % of a difunctional phthalic acid polyester having a hydroxyl number of 150 to 440, 2 to 10 wt % of glycerol, 3.5 to 7 wt % of water, 0.3 to 1 wt % of an incorporable tertiary amine catalyst and 0.1 to 2 wt % of a silicone foam stabilizer (polyol component). Such foams have only moderate acoustic absorption.

The automotive industry, however, is demanding higher acoustic absorption levels, since the level of driving noise in the interior of a vehicle is to be as low as possible. At the same time, good acoustic properties must not come at the expense of ease of processing of the foams to give car roof linings, for example.

The object of the present invention was to provide predominantly (>50 vol %) open-cell (to DIN ISO 4590-86), rigid PU foams having very high acoustic absorption that can be pressed to form automotive interior trim by the cold-forming process.

Open-cell in this context means that more than 50 vol % of the cells present in the foam are open-cell.

High acoustic absorption in this context means that the average acoustic absorption in the frequency range from 800 to 6350 Hz within a foam block is not less than 35%, preferably not less than 40%.

It has surprisingly been found that through the use of hexafunctional polyoxyalkylene polyols, very preferably in combination with fatty acid amides of diamines, such as the N,N-dimethylaminopropylamide of tall oil acid, for example, it is possible to obtain high acoustic absorption in PU foams produced therewith. Moreover, the acoustic absorption levels of different samples from the foam block are barely different from one another, meaning that the acoustic absorption is similar over the entire region of the foam block.

The present invention accordingly provides open-cell, cold-formable, consolidated, rigid polyurethane (PU) foams with >50 vol % open-cell content to DIN ISO 4590-86 and with high, uniform acoustic absorption, obtainable by reacting a technical polyisocyanate component A comprising A1) 0 to 10 wt %, preferably 0.1 to 8 wt %, based on the organic polyisocyanate component A), of 2,2'-diphenylmethane diisocyanate, A2) 0 to 30 wt %, preferably 10 to 25 wt %, based on the organic polyisocyanate component A), of 2,4'-diphenylmethane diisocyanate and A3) 25 to 75 wt %, preferably 35 to 55 wt %, based on the organic polyisocyanate component A), of 4,4'-diphenylmethane diisocyanate, with a component B consisting of B1) 10 to 70 wt %, preferably 15 to 35 wt %, based on component B, of polyoxyalkylene polyols having a hydroxyl number of 25 to 110 mg KOH/g, preferably of 25 to 60 mg KOH/g, and a number-average functionality of 2 to 4, B2) 0 to 20 wt %, preferably 5 to 20 wt %, based on component B, of polyoxyalkylene polyols having a hydroxyl number of 150 to 550 mg KOH/g and a functionality of 2, B3) 10 to 66 wt %, preferably 15 to 48 wt %, based on component B, of polyoxyalkylene polyols having a hydroxyl number of 300 to 900 mg KOH/g, preferably 370 to 570 mg KOH/g, and a number-average functionality of 2.5 to 4, B4) 2.5 to 25 wt %, preferably 5 to 20 wt %, based on component B, of polyoxyalkylene polyols having a hydroxyl number of 25 to 195 mg KOH/g and a functionality of 6, B5) 0 to 15 wt %, based on component B, of oligomeric polyester polyols having a hydroxyl number of 195 to 500 mg KOH/g and a number-average functionality of 2 to 5, B6) 0 to 8 wt %, based on component B, of glycerol, B7) 2.5 to 8 wt %, preferably 5 to 7 wt %, based on component B, of water, B8) 0.5 to 4 wt %, based on component B, of catalysts, B9) optionally auxiliaries and/or adjuvants, the NCO index being 85 to 135, preferably 90 to 120.

The NCO index is the ratio of the number of NCO groups to the number of NCO-reactive groups, multiplied by 100.

The rigid polyurethane foams of the invention preferably have a density to DIN 53420 of 15 to 65 kg/m$^3$, more preferably of 19 to 24 kg/m$^3$.

The rigid polyurethane foams of the invention preferably comprise catalysts based on renewable raw materials, more preferably fatty acids, in component B8).

The rigid PU foams of the invention are produced preferably in a batch process. They are used preferably for producing automotive interior trim, more particularly roof linings and pillar trim. Their use as sound absorbers in the interior and exterior of buildings or in trade-fair construction is possible as well, in which case the tire behaviour ought to satisfy the requirements of the building material class (DIN 4102-1 or DIN EN 13501-1). For this purpose, where necessary, suitable flame retardants ought additionally to be added (tris(1-chloro-2-propyl) phosphate, tris(1,3-dichloroisopropyl) phosphate, triethyl phosphate, polybrominated polyoxyalkylene polyols, tris(2-chloroethyl) phosphate, tricresyl phosphates, triphenyl phosphate, resorcinol bis(diphenyl phosphate), bisphenol A bis(diphenyl phosphate)).

The foam of the invention is produced preferably by mixing the polyol formulation B with polyisocyanate component A, generally in proportions by weight of 100:150 to 100:200, preferably to 100:165. This mixing is typically accomplished using a low-pressure foaming machine, such as a Cannon C 300 or Hennecke HK 5000 R, for example. Production of blocks takes place preferably batchwise, with the foamable mixture being poured into a box of appropriate size whose base area is determined by the later size of the car lining.

Determining the Acoustic Absorption

The acoustic absorption of the foams was measured in a Kundt tube. Measurement took place on foams with a layer thickness of 1 cm. The diameter of the test specimens was 3 cm, and is required to fit exactly into the Kundt tube.

In the Kundt tube, sound waves passed through a pipe were sent through the test specimen and reflected by the test specimen in turn from an acoustically hard wall located behind the test specimen with no gap in between. Using two microphones arranged between the sound source and the reflecting wall, by capturing the amplitude information and phase information, it is possible to determine the amplitude ratio between the incident sound wave and the associated reflected sound wave. This amplitude ratio produces the degree of absorption.

The polyisocyanate component used preferably comprises mixtures of 4,4'-, 2,4'- and 2,2'-diphenylmethane diisocyanates and polyphenyl-polymethylene polyisocyanates (crude MDI).

Used preferably as component B1) are polyoxyalkylene polyols in the hydroxyl number range from 25 to 110 mg KOH/g, more preferably 25 to 60 mg KOH/g, which are obtainable preferably by reaction of ethylene oxide and/or propylene oxide with trihydric polyols, such as glycerol, trimethylolpropane, for example, or with dihydric polyols, such as ethylene glycol, diethylene glycol, 1,2- or 1,3-propylene glycol, 1,4-butanediol, isosorbide, neopentyl glycol, dibromoneopentyl glycol, bisphenols, etc.

Used as component B2) are difunctional polyoxyalkylene polyols in the hydroxyl number range from 150 to 550 mg KOH/g, which are obtainable preferably by reaction of propylene oxide with polyols, such as ethylene glycol, diethylene glycol, 1,2- or 1,3-propylene glycol, 1,4-butanediol, isosorbide, neopentyl glycol, dibromoneopentyl glycol, bisphenols, etc.

Used as component B3) are polyoxyalkylene polyols in the hydroxyl number range from 300 to 900 mg KOH/g, preferably 370 to 570 mg KOH/g, which are obtainable preferably by reaction of propylene oxide with glycols, such as ethylene glycol, diethylene glycol, 1,2- or 1,3-propylene glycol, and 1,4-butanediol, and with glycerol and 1,1,1-trimethylolpropane etc.

Used as component B4) are hexafunctional polyoxyalkylene polyols in the hydroxyl number range from 25 to 195 mg KOH/g, which are obtainable preferably by reaction of ethylene oxide and/or propylene oxide with sorbitol.

The catalysts B8) employed include compounds which accelerate the reaction of the reaction components containing reactive hydrogen atoms, more particularly hydroxyl groups, and also of water, with the organic polyisocyanates a). Those contemplated include organometallic compounds, preferably organotin compounds, such as tin(II) salts of organic carboxylic acids, for example tin(II) acetate, tin(II) octoate, tin(II) ethylhexanoate, tin(II) laurate, and the dialkyltin(IV) salts of organic carboxylic acids, for example dibutyltin diacetate, dibutyltin dilaurate, dibutyltin maleate, dioctyltin diacetate, and also tertiary amines such as triethylamine, tributylamine, dimethylcyclohexylamine, dimethylbenzylamine, N-methylimidazole, N-methyl-, N-ethyl- and N-cyclohexylmorpholine, N,N,N',N'-tetramethyl-ethylenediamine, N,N,N',N'-tetramethylbutylenediamine, N,N,N',N'-tetramethylhexylene-1,6-diamine, pentamethyl-diethylenetriamine, tetramethyldiaminoethyl ether, bis(dimethylaminopropyl)urea, dimethylpiperazine, 1,2-dimethylimidazole, 1-azabicyclo[3.3.0]octane, 1,4-diazabicyclo[2.2.2]octane, and alkanolamine compounds such as triethanolamine, tris-isopropanolamine, N-methyl- and N-ethyldiethanolamine and dimethylethanolamine. Further contemplated as catalysts are the following: amine oxides, bis(2-dimethylaminoethyl) ether, tris(dialkylamino)-s-hexahydrotriazines, more particularly tris(N,N-dimethylamino)-s-hexahydrotriazine, tetraalkylammonium salts such as, for example, N,N,N-trimethyl-N-(2-hydroxypropyl) formate, N,N,N-trimethyl-N-(2-hydroxypropyl) 2-ethylhexanoate tetraalkylammonium hydroxides such as tetramethylammonium hydroxide, alkali metal hydroxides such as sodium hydroxide, alkali metal alkoxides such as sodium methoxide and potassium isopropoxide, salts of bismuth, of titanium and of zinc, and also alkali metal salts or alkaline earth metal salts of fatty acids having 1 to 20 C atoms and optionally pendant OH groups.

Preference is given to using isocyanate-reactive tertiary amines such as, for example, N,N-di-methylaminopropylamine, bis(dimethylaminopropyl)amine, N,N-dimethylaminopropyl-N'-methylethanolamine, dimethylaminoethoxyethanol, bis(dimethylaminopropyl)amino-2-propanol, N,N-dimethylaminopropyldipropanolamine, N,N,N'-trimethyl-N'-hydroxyethyl-bisaminoethyl ether, N,N-dimethylaminopropylurea, N-(2-hydroxypropyl)imidazole, N-(2-hydroxyethyl)imidazole, N-(2-aminopropyl)imidazole, 2-((dimethylamino)ethyl)methyl-aminopropanol, 1,1'-((3-(dimethylamino)propyl)imino)bis-2-propanol and/or the reaction products described in EP-A 0 629 607 of ethyl acetoacetate, polyether polyols and 1-(dimethylamino)-3-aminopropane, and also, in particular, the tall oil acid amide salt of N,N-dimethylaminopropylamine.

Further examples of auxiliaries and/or adjuvants B9) that can be used as well optionally in accordance with the invention are emulsifiers, reaction retardants, stabilizers against effects of aging and of weathering, plasticizers, inorganic flame retardants, phosphorus- and/or halogen-containing organic flame retardants, substances with fungistatic and bacteriostatic activity, pigments and dyes, and also the customary organic and inorganic fillers that are known per se. Examples that may be given of emulsifiers include ethoxylated alkylphenols, alkali metal salts of fatty acids, alkali metal salts of sulphated fatty acids, alkali metal salts of sulphonic acids, and salts of fatty acids and amines.

Examples of suitable foam stabilizers and emulsifiers include siloxane-polyoxyalkylene copolymers, organopolysiloxanes, ethoxylated fatty alcohols, alkylphenols and castor oil esters and ricinoleic esters, and betaines, amines and amine oxides based on fatty acid.

Active cell openers include, for example, paraffins, polybutadienes, fatty alcohols and optionally polyether-modified dimethylpolysiloxanes.

Further details of the mode of use and mode of action of the aforementioned auxiliaries and adjuvants are described for example in Kunststoff-Handbuch, Polyurethane, Volume VII, Carl Hanser Verlag, Munich, Vienna, 2$^{nd}$ edition, 1983.

The open-cell, cold-formable, consolidated, rigid polyurethane (PU) foams in accordance with the invention are used preferably in composite materials as sound absorber.

The open-cell, cold-formable, consolidated, rigid polyurethane (PU) foams of the invention are used preferably in the production of automotive interior trim, more particularly of roof linings and pillar trim.

The purpose of the examples which follow is to elucidate the invention in more detail.

INVENTIVE AND COMPARATIVE EXAMPLES

Products Used:
Niax® Silicone SR 234 and Niax® Silicone SR 272 from Momentive Performance Materials, Si foam stabilizer.

Production of the Rigid PU Foams

Inventive Example 1

A mixture (component B) of
22.7 parts by weight of polyether alcohol (B1) based on glycerol/propylene oxide/ethylene oxide, OH number 35 mg KOH/g, functionality 3,
10.0 parts by weight of polyether alcohol (B2) based on 1,2-propylene glycol, OH number 260 mg KOH/g, functionality 2,
41.4 parts by weight of polyether alcohol (B3) based on glycerol, OH number 450 mg KOH/g, functionality 3,
8.8 parts by weight of polyether alcohol (B4) based on sorbitol/propylene oxide/ethylene oxide, OH number 28.5 mg KOH/g, functionality 6,
6.0 parts by weight of glycerol (B6)
3.0 parts by weight of reaction product of tall oil acid and N,N-dimethylaminopropylamine (B8)
1.5 parts by weight of silicone foam stabilizer (B9) (Niax® Silicone SR 272 from Momentive Performance Materials),
6.50 parts by weight of water (B7) and
0.10 part by weight of Isopur N black paste (B9) from ISL-Chemie of Kürten, DE
was mixed with
165 parts by weight of a mixture (A component) of diphenylmethane diisocyanates and polyphenylpolymethylene polyisocyanates having a diphenylmethane diisocyanate isomer content of 60 wt % and an NCO content of 31.8 wt %. A1): 13.9 wt %, based on the organic polyisocyanate component A), of 2,4'-diphenylmethane diisocyanate and A2): 44.7 wt %, based on organic polyisocyanate component A), of 4,4'-diphenylmethane diisocyanate.

Comparative Example 1

A mixture (component B) of
31.0 parts by weight of polyether alcohol (B1) based on glycerol/propylene oxide/ethylene oxide, OH number 28 mg KOH/g, functionality 3,
35.05 parts by weight of polyether alcohol (B3) based on trimethylolpropane/propylene oxide, OH number 550 mg KOH/g, functionality 3,
12.0 parts by weight of polyether alcohol (B2) based on propylene glycol/propylene oxide, OH number 512 mg KOH/g, functionality 2,
15.0 parts by weight of reaction product of phthalic anhydride, diethylene glycol and ethylene oxide, OH number 300 mg KOH/g, functionality 2 (B5),
0.50 part by weight of 1,1'-((3-(dimethylamino)propyl)imino)bis-2-propanol and 0.05 part by weight of bis(2-dimethylaminoethyl) ether (B8),
0.20 part by weight of silicone foam stabilizer (Niax® Silicone SR 234 from Momentive Performance Materials) (B9),
5.80 parts by weight of water (B7) and
0.50 part by weight of Isopur N black paste (B9) from ISL-Chemie of Kürten, DE
was mixed with
175 parts by weight of a mixture (A component) of diphenylmethane diisocyanates and polyphenylpolymethylene polyisocyanates having a diphenylmethane diisocyanate isomer content of 60 wt % and an NCO content of 31.8 wt %. A1): 13.9 wt %, based on the organic polyisocyanate component A), of 2,4'-diphenylmethane diisocyanate and A2): 44.7 wt %, based on organic polyisocyanate component A), of 4,4'-diphenylmethane diisocyanate.

Blocks with a block size of 30×30×30 cm were produced for the purpose of measuring the acoustic properties of the foam. Additionally, blocks in dimensions of 1.0×1.0×0.8 to 1.0 m and in dimensions of 1.4×2.2×1.0 m were produced for the purpose of assessing the homogeneity of the acoustic properties. Foam panels in 10 mm and 14 mm panel thickness were tested and evaluated.

For this purpose, the bottom 15 cm of the foam blocks (1.4×2.2×1.0 m) were cut away. This region may have defects resulting from cell opening at the end of the reaction, and is therefore less suitable. Moreover, the cap of the foam block was cut away (approximately 10 cm). The foam block was split into panels, and then panels were taken from the bottom, middle and top regions, and the acoustic properties were measured in the Kundt tube.

The table below contains the acoustic absorptions from Inventive Example 1 (foam block: 1.0×1.0×0.8 to 1.0 m). The table indicates the position from which the specimens measured were taken. In this context, CT denotes "corner top", CM "corner middle", CB "corner bottom", MT "middle top", MM "middle middle", and MB "middle bottom".

| Frequency | CT | CM | CB | MT | MM | MB | Average | Standard deviation |
|---|---|---|---|---|---|---|---|---|
| Average 800-6350 Hz | 50% | 49% | 44% | 51% | 49% | 50% | 49% | 8% |

The physical properties of the foams as well become more homogeneous. The table below contains the physical properties from Inventive Example 1 (foam block: 1.0×1.0×0.8 to 1.0 m).

| | Standard | MT | MM | MB | CT | CM | CB | Average | Standard deviation |
|---|---|---|---|---|---|---|---|---|---|
| Gross density [kg/m$^3$] | DIN 53420 | 23.1 | 22.3 | 24.9 | 23.3 | 23.0 | 24.0 | 23.4 | 0.9 |

-continued

|  | Standard | MT | MM | MB | CT | CM | CB | Average | Standard deviation |
|---|---|---|---|---|---|---|---|---|---|
| Compression test [MPa] | DIN EN 826 | 0.09 | 0.10 | 0.12 | 0.08 | 0.11 | 0.11 | 0.10 | 0.015 |
| Open-cell content [Vol %] | DIN ISO 4590-86 | 92 | 92 | 89 | 92 | 87 | 85.9 | 89.5 | 2.6 |
| Tensile strength [MPa] | DIN 53430 | 0.18 | 0.14 | 0.16 | 0.19 | 0.15 | 0.18 | 0.17 | 0.02 |
| Elongation at break [%] | DIN 53430 | 14.2 | 14.8 | 15.8 | 14.1 | 15.7 | 15.7 | 15.05 | 0.8 |

The table below contains the acoustic absorptions from Comparative Example 1 (foam block: 1.0×1.0×0.8 to 1.0 m)

| Frequency | CT | CM | CB | MT | MM | MB | Average | Standard deviation |
|---|---|---|---|---|---|---|---|---|
| Average 800-6350 Hz | 34% | 41% | 32% | 39% | 51% | 39% | 40% | 9% |

The table below contains the physical properties of the foams from Comparative Example 1 (foam block: 1.0×1.0×0.8 to 1.0 m)

|  | Standard | MT | MM | MB | CT | CM | CB | Average | Standard deviation |
|---|---|---|---|---|---|---|---|---|---|
| Gross density [kg/m³] | DIN 53420 | 24.24 | 21.91 | 24.54 | 24.68 | 22.34 | 23.62 | 23.56 | 1.17 |
| Compression test [MPa] | DIN EN 826 | 0.1 | 0.1 | 0.1 | 0.1 | 0.1 | 0.1 | 0.10 | 0.01 |
| Open-cell content [vol %] | DIN SO 4590-86 | 81 | 86 | 77 | 79 | 78 | 66 | 77.6 | 6.5 |
| Tensile strength [MPa] | DIN 53430 | 0.227 | 0.163 | 0.177 | 0.223 | 0.169 | 0.192 | 0.192 | 0.027 |
| Elongation at break [%] | DIN 53430 | 15.2 | 16.7 | 20.8 | 14.3 | 22.5 | 17.4 | 17.80 | 3.19 |

It was found that the use of hexafunctional polyethers resulted in higher average acoustic absorption in conjunction with improved homogeneity as represented by the standard deviation. The standard deviations in the gross density, open-cell content, tensile strength and elongation at break showed that in terms of these properties as well, the use of hexafunctional polyethers resulted in improved homogeneity.

Variation in the Mixing Ratio
(Inventive Example 2)

Foams below were produced by subjecting, in a cardboard beaker with a size of approximately 1l, a mixture of component B), comprising
22.5 parts by weight of polyether alcohol (B1) based on glycerol/propylene oxide/ethylene oxide, OH number 35 mg KOH/g, functionality 3,
10.0 parts by weight of polyether alcohol (B2) based on 1,2-propylene glycol, OH number 260 mg KOH/g, functionality 2,
41.1 parts by weight of polyether alcohol (B3) based on glycerol, OH number 450 mg KOH/g, functionality 3,
8.7 parts by weight of polyether alcohol (B4) based on sorbitol/propylene oxide/ethylene oxide, OH number 28.5 mg KOH/g, functionality 6,
5.95 parts by weight of glycerol (B6),
3.1 parts by weight of reaction product of tall oil acid and N,N-dimethylaminopropylamine (B8),
1.5 parts by weight of silicone foam stability (B9) (Niax® Silicone SR 272 from Momentive Performance Materials) and 0.2 part by weight of silicone foam stabilizer (B9) (Niax® Silicone SR 234 from Momentive Performance Materials),
6.45 parts by weight of water (B7), and
0.50 part by weight of Isopur N black paste (B9),
to mixing with
I) 160 parts by weight of a mixture (A component) of diphenylmethane diisocyanates and polyphenylpolymethylene polyisocyanates having a diphenylmethane diisocyanate isomer content of 60 wt % and an NCO content of 31.8 wt % [A1]: 13.9 wt %, based on the organic polyisocyanate component A), of 2,4'-diphenylmethane diisocyanate and A2): 44.7 wt %, based on organic polyisocyanate component A), of 4,4'-diphenyl-methane diisocyanate] or
II) 180 parts by weight of a mixture (A component) of diphenylmethane diisocyanates and polyphenylpolymethylene polyisocyanates having a diphenylmethane diisocyanate isomer content of 60 wt % and an NCO content of 31.8 wt % [A1]: 13.9 wt %, based on the organic polyisocyanate component A), of 2,4'-diphenylmethane diisocyanate and A2): 44.7 wt %, based on organic polyisocyanate component A), of 4,4'-diphenyl-methane diisocyanate] or
III) 200 parts by weight of a mixture (A component) of diphenylmethane diisocyanates and polyphenylpolymethylene polyisocyanates having a diphenylmethane diisocyanate isomer content of 60 wt % and an NCO content of 31.8 wt % [A1]: 13.9 wt %, based on the organic polyisocyanate component A), of 2,4'-diphenylmethane diisocyanate and A2): 44.7 wt %, based on organic polyisocyanate component A), of 4,4'-diphenyl-methane diisocyanate]
at 4200 rpm for 21 s, using a Pendraulic stirrer with a stirrer plate having a diameter of 6.5 cm. The table below contains the acoustic absorptions from Comparative Example 1 (foam block: about 0.3×0.3×0.3 m). The height varies somewhat and decreases from 31.8 cm to 29.0 cm as the mixing ratio goes up. The test specimens were taken from the middle of the foam.

|  | 2a | 2b | 2c |
| --- | --- | --- | --- |
| Isocyanate per 100 g polyol | 160 g | 180 g | 200 g |
| Average 800-6350 Hz | 42% | 46% | 44% |

As can be seen from the table, the high acoustic absorption is obtained for all the mixing ratios.

Inventive Example 3

A mixture (component B) of

| Component | Formula 3a | Formula 3b | Formula 3c |
| --- | --- | --- | --- |
| Polyether alcohol (B4) based on sorbitol/propylene oxide/ethylene oxide, OH number 28.5 mg KOH/g, functionality 6 | 15.00 | 20.00 | 31.20 |
| Polyether alcohol (B1) based on glycerol/propylene oxide/ethylene oxide, OH number 35 mg KOH/g, functionality 3 | 16.20 | 11.20 | |
| Polyether alcohol (B2) based on 1,2-propylene glycol, OH number 260 mg KOH/g, functionality 2 | 10.00 | 10.00 | 10.00 |
| Polyether alcohol (B3) based on glycerol, OH number 450 mg KOH/g, functionality 3 | 41.10 | 41.10 | 41.10 |
| Glycerol (B6) | 5.95 | 5.95 | 5.95 |
| Water (B7) | 6.45 | 6.45 | 6.45 |
| Niax ® Silicone SR 272 (B9) | 1.50 | 1.50 | 1.50 |
| Niax ® Silicone SR 234 (B9) | 0.20 | 0.20 | 0.20 |
| Isopur N black paste | 0.50 | 0.50 | 0.50 |
| Reaction product of tall oil acid and dimethylaminopropylamine (B8) | 3.10 | 3.10 | 3.10 | was mixed with 160 parts by weight of a mixture (A component) of diphenylmethane diisocyanates and polyphenylpolymethylene polyisocyanates having a diphenylmethane diisocyanate isomer content of 60 wt % and an NCO content of 31.8 wt % [A1): 13.9 wt %, based on the organic polyisocyanate component A), of 2,4'-diphenylmethane diisocyanate and A2): 44.7 wt %, based on organic polyisocyanate component A), of 4,4'-diphenylmethane diisocyanate].

The table below contains the acoustic absorptions (foam block: about 0.3×0.3×0.3 m).

|  | 3a | 3b | 3c |
| --- | --- | --- | --- |
| Average 800-6350 Hz | 51% | 51% | 46% |

The invention claimed is:

1. An open-cell, cold-formable, consolidated, rigid polyurethane foam comprising >50 vol % open-cell content according to DIN ISO 4590-86 and having high, uniform acoustic absorption, obtained by reacting component A) comprising
   A1) 0 to 10 wt %, based on component A), of 2,2'-diphenyl-methane diisocyanate,
   A2) 0 to 30 wt %, based on component A), of 2,4'-diphenylmethane diisocyanate and
   A3) 25 to 75 wt %, based on component A), of 4,4'-diphenyl-methane diisocyanate,
   and component B) consisting of
   B1) 10 to 70 wt %, based on component B), of polyoxyalkylene polyols having a hydroxyl number of 25 to 110 mg KOH/g and a number-average functionality of 2 to 4,
   B2) 0 to 20 wt %, based on component B), of polyoxyalkylene polyols having a hydroxyl number of 150 to 550 mg KOH/g and a functionality of 2,
   B3) 10 to 66 wt %, based on component B), of polyoxyalkylene polyols having a hydroxyl number of 300 to 900 mg KOH/g and a number-average functionality of 2.5 to 4,
   B4) 2.5 to 25 wt %, based on component B), of polyoxyalkylene polyols having a hydroxyl number of 25 to 195 mg KOH/g and a functionality of 6,
   B5) 0 to 15 wt %, based on component B), of oligomeric polyester polyols having a hydroxyl number of 195 to 500 mg KOH/g and a number-average functionality of 2 to 5,
   B6) 0 to 8 wt %, based on component B), of glycerol,
   B7) 2.5 to 8 wt %, based on component B), of water,
   B8) 0.5 to 4 wt %, based on component B), of a catalyst, and
   B9) optionally auxiliaries and/or adjuvants,
   wherein the ratio of the number of NCO groups in component A) to the number of OH groups in component B) multiplied by 100 (NCO index) is in the range of 85 to 135.

2. The polyurethane foam according to claim 1, having a density according to DIN 53420 of 15 to 65 kg/m$^3$.

3. The polyurethane foam according to claim 1, comprising a catalyst based on renewable raw materials in component B8).

4. A method comprising utilizing the polyurethane foam according to claim 1 in composite materials as sound absorbers.

5. A method for producing automotive interior trim, comprising utilizing the polyurethane foam according to claim 1.

6. An automotive interior trim, roof lining or pillar trim comprising the polyurethane foam according to claim 1.

7. The polyurethane foam according to claim 1, wherein the catalyst of component B8) is selected from the group consisting of fatty acid amides of diamines.

* * * * *